United States Patent Office 3,397,040

Patented Aug. 13, 1968

3,397,040

SPECTROPHOTOMETRIC METHOD FOR THE DETERMINATION OF GOLD

Hubert W. Lakin, Lakewood, and Harry M. Nakagawa, Denver, Colo., assignors to the United States of America as represented by the Secretary of the Interior No Drawing. Filed Feb. 28, 1966, Ser. No. 532,533
7 Claims. (Cl. 23—230)

This invention relates to an exploration method for detecting and determining the amount of gold present in geologic materials such as soil, rocks and minerals.

Present gold determination methods employed during prospecting and studies of the chemical composition of the earth's crust either involve expensive equipment or are slow and tedious. Furthermore, although some of these methods such as the classical fire assay process are very accurate, they lack sensitivity towards the presence of minute amounts of gold in geologic materials, and lack the necessary mobility for a successful gold determination field process that can be employed in the area where the geologic sample is taken.

The object of the present invention is to provide an inexpensive method sensitive to the presence of minute quantities of gold in the geologic sample being tested, which method is highly suitable for field applications.

The process of the invention is as follows:

A geologic sample is initially ground to a powder, for example, about 80 to about 200 Tyler mesh size, so that during later acid treatment most of the gold present in the sample will come into contact with the acid solution. After roasting the ground sample to burn off organic materials and to volatilize certain elements such as mercury and selenium, it is contacted with a concentrated hydrobromic acid-bromine solution which dissolves elemental gold and gold compounds present in the sample. Sodium bromate powder can be preliminarily mixed with the roasted sample (prior to contact with the acid) to provide the bromine for the oxidation of the sample and dissolution of gold. No attempt is made to dissolve the entire sample; only to bring the acid and bromine in contact with most of the gold present in the sample by the preliminary grinding of the sample to a powder. Aqua regia could be used as the dissolution agent in which case it would be then necessary to effect a transfer of the gold in the nitric acid-hydrochloric acid to a hydrobromic acid solution.

Pregnant acid solution resulting from the hydrobromic acid dissolution step is diluted with water and then mixed with ethyl ether which is capable of extracting the gold present therein. Dilution of the aqueous solution prior to extraction prevents other elements such as iron from being extracted. About a 1.5 N to about 8.0 N hydrobromic acid solution concentration yields a maximum gold extraction by the ether solution. Since gold tends to be adsorbed on particles of insoluble residue remaining after the dissolution step, the insoluble residue is not removed from the acid solution during the ether contacting step. As a result, when the ether removes gold from the aqueous acid solution, adsorbed gold goes into solution and likewise becomes extracted by the ether. The extracted ether phase is separated from the aqueous acid raffinate phase and remaining residue.

Ethyl ether extract phase is then extracted with about a 1.2 N to about 1.8 N hydrobromic acid which extracts iron, silver, mercury and palladium which may be present in the pregnant ethyl ether solution, but does not remove gold therefrom. The ethyl ether raffinate phase formed is separated from the acid extract phase. Afterwards the ether solution is completely evaporated; the solid residue is dissolved in dilute ammonium acetate or nitrilo triacetic acid; and 4,4'-bis(dimethylamino)thiobenzophenone (thio-Michler's ketone; TMK) in an organic carrier solvent such as isoamyl alcohol is added thereto to yield a solution with a red color whose intensity is proportional to the amount of gold present. If a spectrophotometer is available, the amount of gold present can be determined by a light absorbence test. If a test out in the field is desired, standard solutions each containing known quantities of gold may be prepared and compared red color intensity-wise with the test solution.

The following example illustrates a field method that may be employed:

Sample solution (1) Place 1 g. (or one 1 ml. scoopful) of the finely powdered sample in a porcelain crucible and ignite for 10 minutes over a burner.

(2) Transfer cool sample to a 50 ml. Erlenmeyer flask and add one Teflon covered magnet, 0.2 ml. solid $NaBrO_3$ and 5 ml. concentrated HBr. Warm slightly on a magnetic stirring hot plate to start reaction.

(3) Add, at once, 15 ml. concentrated HBr and boil until the volume is reduced to 5 ml. Allow to cool.

Extraction (1) Transfer entire contents of flask to a 22 x 175 mm. rimless culture tube. Wash flask with 15 ml. water and add to culture tube. Total volume in the tube should be approximately 20 ml.

(2) Add 15 ml. of ethyl ether to the contents of the culture tube, stopper the tube with a cork and shake for 1 minute.

(3) Allow the phases to separate and, with an automatic pipet, transfer the ether phase to an 18 x 150 mm. culture tube. The ether should be colorless. If the ether is colored, return it to a 22 x 175 mm. culture tube containing 1 ml. of 1.5 N HBR, shake for 15 seconds and repeat the removal process.

(4) Add 1 ml. water and a Teflon covered magnet to the ether. Evaporate the ether by placing the tube in a water bath on a magnetic stirring hot plate.

Estimation (1) To the cool solution add 1 ml. nitrilotriacetic acid (NTA) solution, 4 ml. water, and 1 ml. TMK. Stopper tube and shake gently for 15 seconds.

(2) Compare the sample solution with standards prepared at the same time.

Preparation of standards

Transfer appropriate aliquots of a gold solution corresponding to 0, 0.05, .1, .2, .5, 1.5, 2, and 3 micrograms Au to 22 x 175 mm. rimless culture tubes containing 20 ml. of 3 N HBr and 0.1 ml. $FeBr_3$. Add 15 ml. ethyl ether. stopper the tubes with corks and shake for 1 minute. Proceed from step 3 of extraction procedure.

Reagents

Standard gold solution (0.1 percent): Dissolve exactly 1.0000 g. Au in $HBr\text{–}Br_2$ and heat gently to expel excess $Br_2$. Cool and dilute to 1,000 ml. with conc. HBr.

Dilute gold solution (.0001 percent): Dilute 0.1 ml. of 0.1 percent Au solution to 100 ml. with 1.5 N HBr. Prepare fresh daily.

Hydrobromic acid, concentrated, reagent grade, distilled.

Hydrobromic acid, 1.5 N: Dilute 172 ml. conc. HBr to 1 liter with water.

Sodium bromate, powder, reagent grade.

Ethyl ether, reagent grade.

Nitrilo triacetic acid (NTA) solution (10 percent): To 10 g. NTA in 50 ml. water add NaOH pellets until solution is complete. Dilute to 100 ml. with water. The pH of this solution should be about 3.3.

Isoamyl alcohol, reagent grade.

Thio Michler's ketone (TMK) solution: Dissolve 14.25 mg. of 4,4'-bis(dimethylamino) thiobenzophenone in 400 ml. isoamyl alcohol. Heat gently to hasten solution. Cool and dilute to 1000 ml. with isoamyl alcohol. Keep cold and protect from light.

Interferences

Samples containing more than 0.4% mercury and silver represent potential interferences with the process because they form colored compounds with TMK. However, samples containing larger quantities of mercury can be tolerated because the roasting step in the process drives off the mercury.

Palladium forms a pink colored compound and becomes an interference in quantities greater than 300 micrograms in a one gram sample.

Thallium ions with a charge of +3 normally react at a pH of 3 with TMK to give a blue colored complex which offers a potential interference to the gold determination process. However, this interference can be avoided by employing NTA rather than ammonium acetate as the residue dissolving agent, since the thallium and NTA form a complex which is adequate to prevent interference except in samples unusually high in thallium. In one series of 1200 gold determination tests on various geologic materials, only 4 tests resulted in blue color interference from the thallium. Smaller sample aliquots of the materials that had yielded the interference were then tested, and no blue color was evident in the final red color intensity analysis.

High grade antimony ores cause difficulties for gold determination because ethyl ether will extract antimony from a 3 N HBr solution. On dilution of the residue from the ether evaporation step, hydrolysis of antimony bromide yields an interfering white precipitate.

In addition to these above interferences, cadmium and uranium also interfere. The presence of one milligram of either of these elements in a one gram test sample yields a color equivalent to 0.1 microgram of gold in the test sample.

Bromine used in the digestion process of the sample can be a very serious interference if it is not entirely removed. A trace of bromine left in the same solution is adequate to oxidize the TMK causing a green color. Boiling the hydrobromic acid-bromine solution of the sample eliminates the bromine.

The following tables indicate the precision and accuracy of the analytical process of the invention.

TABLE 1.—REPEATABILITY OF PROCESS OF THE PRESENT INVENTION ON GOLD ORE 5-GRAM SAMPLES

| Material | Number of determinations | Gold Content, p.p.m. Maximum | Minimum | Average | Standard deviation | Relative standard deviation percent |
|---|---|---|---|---|---|---|
| A | 9 | 1.00 | 0.60 | 0.81 | 0.13 | 16.1 |
| B | 4 | 0.98 | 0.73 | 0.81 | 0.10 | 12.3 |
| C | 5 | 24.0 | 18.4 | 21.7 | 2.01 | 9.3 |

TABLE 2.—COMPARISON OF METHOD OF PRESENT INVENTION WITH FIRE ASSAY

| | Gold Content, p.p.m. | |
|---|---|---|
| | Present Invention | Fire Assay |
| Sample No.: | | |
| 1 | 0.83 | 0.68 |
| 2 | 1.57 | 1.37 |
| 3 | 1.16 | 1.37 |
| 4 | 3.75 | 4.80 |
| 5 | 6.42 | 6.84 |
| 6 | 14.3 | 10.3 |
| 7 | 24.4 | 26.5 |

Table 1 shows, as expected, that the standard deviation on a single material, decreases as the amount of gold present increases. The fact that each 5-gram sample of a particular material actually varies in gold content from one sample to another contributes to the standard deviation. The fact that the process of the present invention compares favorably accuracy-wise with the classical fire assay method is shown in Table 2.

While the particular process herein described is well adapted to carry out the objects of the present invention, it is to be understood that various modifications and changes may be made all coming within the scope of the following claims.

What is claimed is:

1. A process for detecting and determining the amount of gold present in geologic materials containing gold values and not containing silver, palladium, thallium, antimony, cadmium or uranium in amounts that would interfere with the detecting and determining process comprising (a) roasting a measured, particulate sample of geologic material;

(b) contacting said roasted sample with a concentrated hydrobromic acid-bromine solution for a period of time sufficient to dissolve out elemental gold and gold compounds present in the sample and form a pregnant acid solution;

(c) diluting said pregnant acid solution to form a diluted solution;

(d) mixing said diluted solution including any solid sample residue remaining after the acid contacting step with an ethyl ether solution to extract gold values from the diluted solution and residue, and form, along with remaining residue, an ethyl ether extract phase and an acid raffinate phase;

(e) separating said extract phase from the raffinate and remaining residue;

(f) contacting said ethyl ether extract phase with a dilute hydrobromic acid solution more dilute than the previously mentioned dilute hydrobromic acid solution to form an ethyl ether raffinate phase and an acid extract phase;

(g) separating the ethyl ether raffinate phase from the acid extract phase;

(h) evaporating completely said ethyl ether raffinate phase to form a solid residue;

(i) dissolving said solid residue in a dilute solution of a compound selected from the group consisting of ammonium acetate and nitrilo triacetic acid;

(j) adding 4,4'-bis(dimethyl amino)thiobenzophenone (TMK) in an organic carrier solvent to the thus formed solution of solid residue (i) to yield a test solution with a red color the intensity of which is proportional to the amount of gold present therein; and (k) determining the amount of gold in the test solution.

2. The process of claim 1 wherein the determining of (k) is by spectrophotometer.

3. The process of claim 1 wherein the determining of (k) is by standard TMK solutions containing known amounts of gold.

4. The process of claim 1 wherein the roasted geologic sample is also treated with sodium bromate during the concentrated hydrobromic acid contacting step to furnish the bromide necessary for the dissolution of the gold.

5. The process of claim 1 wherein said pregnant acid solution is diluted (step c) to a concentration ranging from about 1.5 N to about 8.0 N.

6. The process of claim 1 wherein said ethyl ether extract phase is contacted with a dilute hydrobromic acid solution (step f) having a concentration of from about 1.2 N to about 1.8 N.

7. The process of claim 1 wherein the particulate size of said geologic sample is from about 80 to about 200 Tyler mesh.

References Cited

FOREIGN PATENTS 27,977 1904 Great Britain.

OTHER REFERENCES

W. B. Holbrook et al., Anal. Chem. 36, #13, 2451–3 (1941).

G. H. Faye et al., Anal. Chem. 33, #13, 1914–6 (1961).

MORRIS O. WOLK, *Primary Examiner.*

R. M. REESE, *Assistant Examiner.*